United States Patent Office 3,239,450
Patented Mar. 8, 1966

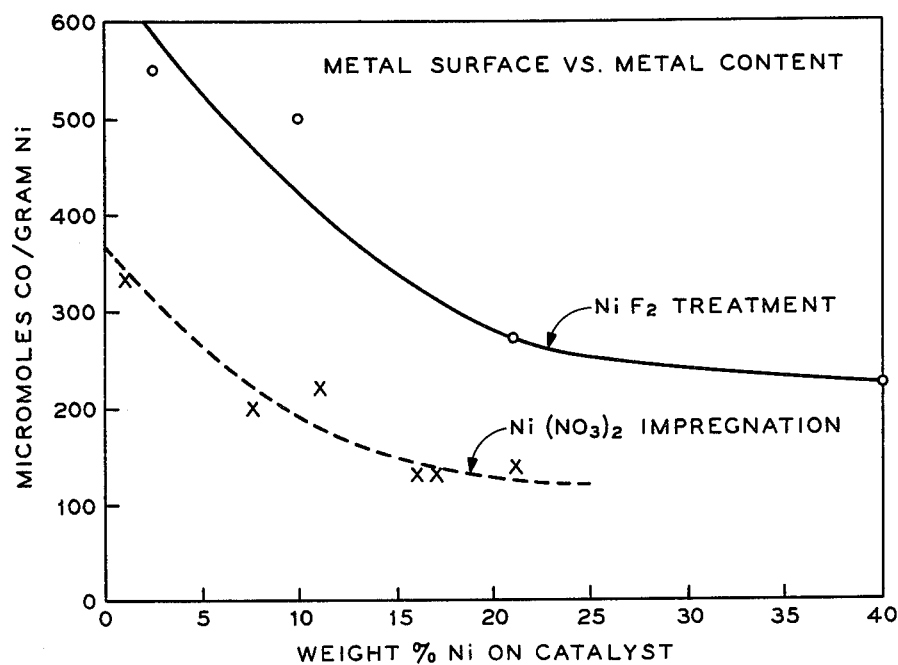

3,239,450
CATALYST FOR HYDROCARBON CONVERSIONS
Robert H. Lindquist, Berkeley, and Roger O. Billman, Martinez, Calif., assignors to Chevron Research Company, a corporation of Delaware
Filed July 3, 1964, Ser. No. 380,148
4 Claims. (Cl. 208—111)

This is a continuation-in-part of application Serial No. 30,373 filed May 19, 1960, now Patent No. 3,140,925.

This invention relates to the manufacture of new catalysts containing alumina or magnesia as essential components of the support, and also containing in special form certain metals and fluoride, which catalysts have particular value in the conversion of hydrocarbon oils. Also, the invention pertains to novel catalysts of improved activity.

The invention contemplates the manufacture of an improved catalyst containing at least alumina or magnesia, as well as highly dispersed metal, particularly hydrogenating metal components, and fluoride. The resultant highly active catalysts are quite useful in hydrocarbon conversions. More specifically, when the catalyst base or support has appreciable cracking activity such as an activated silica-alumina, the metal-fluoride-treated catalysts of the present invention have outstanding properties as low temperature hydrocracking catalysts. Such catalysts, particularly after sulfiding, can be employed in low temperature hydrocracking processes for long periods of operation to give high conversions to desirable products with a minimum of normally gaseous material such as methane and with a low catalyst fouling rate. Catalysts giving even less fouling are those in which residual water-extractable fluorides have been removed before use.

We have found that by contacting an "activated" (i.e. substantially dehydrated) alumina or magnesia support or base material for a sufficiently long period with an aqueous solution of fluoride of catalytically active metal, a superior catalyst is obtained in that the metal of the fluoride becomes associated with the base in a much greater degree of dispersion than heretofore obtainable by conventional means, such as impregnation of the same base with other salts of the same metal. A particular feature of the present method is that it yields catalysts with very high metal surface areas for each unit of weight of added metal. Also, the added metal tends to increase the total surface area of the catalyst rather than decrease the overall surface area as generally happens with other methods such as the usual metal impregnations. Furthermore, the amount of metal that can be incorporated into the base is much greater for the method of the present invention than obtainable heretofore by a single impregnation from an aqueous solution of other salts of the metal. In prior impregnation methods, the amount of metal deposited in a single impregnation is generally limited to the amount of metal contained in an amount of a saturated metal salt solution equal in volume to the pore volume of the particular alumina or magnesia-containing base (which amount is hereinafter referred to as a "pore volume" of the impregnating solution).

The extraordinarily high degree of dispersion for the added metal as obtained by the present invention is shown by the following comparison, wherein CO chemisorption values, as described hereinbelow, are used to measure the surface area of the added metal. Calcined alumina-silica particles (containing about 10% dehydrated alumina and having a surface area of about 375 square meters per gram, as measured by nitrogen adsorption) were impregnated with a saturated nickel nitrate solution and, after subsequent drying at 250° F. for 5 hours, were calcined at 900° F. for 2 hours. These impregnated particles were then treated with 15% aqueous hydrofluoric acid at room temperature and thereafter calcined at 800° F. for 3 hours in a hydrogen atmosphere. As a result, an active catalyst was obtained containing 11 wt. percent nickel and 5.6% fluoride. This catalyst adsorbed 220 micromoles of CO per gram of nickel. Another catalyst prepared from similar alumina-silica particles (containing about 25% alumina) by treatment with aqueous nickel fluoride solution in accordance with the present invention, gave about the same percentages by weight of nickel fluoride, namely, 10.3% nickel and 5.4% fluoride. This second catalyst chemisorbed 500 micromoles of CO per gram of nickel, indicating a degree of dispersion for the nickel of more than twice as great as that for the catalyst prepared by impregnation with nickel nitrate. Such substantial increases in metal surface are highly desirable because of their direct correlation with catalyst activity.

One unusual feautre of the present invention is that the treatment with metal fluoride, particularly with nickel fluoride on alumina-silica, results in a relatively increased total surface area such that the treated catalyst appears to be dentritic. Thus a catalyst prepared by treatment of a calcined alumina-silica support with nickel fluoride to a 24 wt. percent Ni content had a total surface area of 415 m.$^2$/gm. (as measured by nitrogen absorption according to the Brunauer et al. method referred to hereinbelow). This result shows increased surface area caused by the nickel fluoride treatment, assuming even that the alumina-silica support lost none of its original surface area and hence contributed 320 m.$^2$/gm. to the total surface area of the finished catalyst. In contrast, a catalyst prepared from the same calcined alumina-silica support by impregnations with nickel nitrate to about the same nickel content had a total surface area of 180 m.$^2$/gm., indicating that original surface area of the support was lost.

The brief description of method and the resulting catalyst indicates the general nature of the invention, but before describing these aspects of the invention in detail together with particularly preferred aspects, it will be observed that both the catalyst preparation method and catalysts resulting therefrom are novel and have obvious advantages over the prior art. As desired, the highly dispersed metal on the alumina or magnesia-containing base can be converted to various forms such as the reduced metal, the oxides, sulfides, etc., to yield novel catalysts highly active for different hydrocarbon conversion and other processes.

It is found that in the present method the metal fluoride is adsorbed upon the alumina or magnesia base to yield an adsorbed metal fluoride in a high degree of dispersion, that is, with a large metal surface area. The method also yields in a single contacting step a relatively large amount of metal per unit area of base treated. While the explanation for this phenomenon is not intended to be limiting on the invention, it is believed that the mechanism involves a chemisorption phenomenon. The metal and fluoride contents of the aqueous treating solution decrease in about the molecular proportions and no more than relatively minor changes in pH have been observed for the several metal fluorides tested. These various factors apparently affect the nature of the resulting catalyst.

Further, although the present method utilizes "activated" alumina-containing or magnesia-containing catalyst support, the metal fluoride treated catalysts resulting from the present method differ from the products obtained by treating alumina and/or silica catalysts with hydrofluoric acid, or similar sources of fluorine, subsequent to or prior to metal impregnation, in that the present method depends upon the use of essentially neutral metal fluoride solutions and results in added metal of high surface area and simultaneous addition of fluoride. Suffice it to say that in comparison to previous catalyst preparation methods, which mostly produce the catalytically active metal in the form of rather large crystals or aggregates, the catalyst resulting from the present invention is superior in surface area per unit of metal and more metal is added in a single treating step. Further, these properties, particularly the large metal surface area, are retained through the normal drying and calcining as well as in most instances through the subsequent sulfiding or other normal catalyst treating operations. Moreover, the fluoride content remains unusually constant through subsequent reduction, sulfiding and hydrocracking test runs.

The increased surface area of the added metal which characterizes the present catalyst, while set forth in detail in succeeding portions of the specification, can be seen further by reference to the data presented in the accompanying drawing, wherein the figure is a graph showing the contrast in surface per gram of nickel from the CO chemisorption values for a nickel fluoride on silica-alumina catalyst prepared in accordance with the present invention and for a fluorided-nickel catalyst prepared by impregnation of essentially the same alumina-silica support with nickel nitrate and subsequent conversion to nickel and treatment with hydrogen fluoride. When using nickel nitrate, the higher metal contents had to be obtained by resort to a plurality of impregnations. The catalysts of the lower curve in the graph was prepared from alumina-silica containing about 10% dehydrated alumina and having a surface area of about 375 m.$^2$/gm. as measured by nitrogen adsorption, which support had been calcined at 800° F. for 2 hours. This catalyst was impregnated with a saturated nickel nitrate solution, then dried for 5 hours at 250° F., calcined at 900° F., for 2 hours, and reimpregnated with nickel nitrate, as needed. Then, the impregnated catalyst was treated with 15% aqueous hydrofluoric acid at room temperature and thereafter calcined at 800° F. for 3 hours in a hydrogen atmosphere. The catalyst of the present invention as shown in the upper curve, was prepared from alumina-silica containing about 25% dehydrated alumina and having a surface area of about 550 m.$^2$/gm., by contacting the alumina-silica with an aqueous solution of nickel fluoride for sufficiently long periods to chemisorb thereon the desired amount of nickel and thereafter dried at 300° F. for 4 hours and then calcining the product at 900° F. for 3 hours in hydrogen.

The data in the figure illustrates that the surface area of the added metal for the present catalyst is much greater at all added metal contents, than catalysts prepared by methods of impregnating with a metal salt followed by subsequent decomposition of the impregnated salt. The data also illustrate that the present catalyst has different properties from one prepared by impregnation with a non-fluoride salt of a catalytic metal, and a subsequent fluoriding treatment such as with hydrofluoric acid. Also to be noted is that with the present method only one contact with metal-containing solution was needed to obain the desired amounts of added metal.

The alumina or magnesia in the base material must be in the "activated" form prior to treatment in accordance with the present invention. Thus, the various aluminas and alumina-containing base materials, such as alumina and alumina-silica hydrogels, are not only first dried but also are subjected to high temperatures in the range of at least 800° F. up to about 1500° F. for a sufficient time to remove both physically held water and most of the chemically bound water, and to leave the surface substantially dehydrated, i.e., only slightly hydrated with chemically bound water, preferably to the extent of 3 to 10% based upon the weight of the Al$_2$O$_3$ content (plus SiO$_2$ content, if present) of the base material. Ordinarily, about 2–5 hours at 800° F. in a dry atmosphere is sufficient for this purpose, with shorter times being used for the higher temperatures. Such high temperature treatment results in a substantially dehydrated alumina base wherein the alumina is in the "activated alumina" form. The calcination or "activation" treatment also tends to remove volatile substances such as ammonia which might interfere with the combination with the metal fluoride in the subsequent contacting step. Preferably, such aluminas and silica-aluminas will have a high surface area of at least 300 m.$^2$/gm. When less active, though usually less preferred, supports are desired, such as with dehydrogenation catalysts, the support can have a surface area of down to 100 m.$^2$/gm. The magnesia-containing supports are "activated" in a similar fashion.

Other than "activated" alumina per se, various supports containing "activated" alumina can be used such as mixtures of alumina with other materials including silica; however, alumina is greatly preferred when the hydrofining activity of the catalyst is to be emphasized, and siliceous aluminas when hydrocracking is desired. Likewise, various supports containing or composed of, "activated" magnesia can be employed, such as magnesia-silica, magnesia-silica-zirconia and the like. For most purposes, the alumina-containing supports are preferred because of their generally greater heat stability and hence, the invention is illustrated hereinafter mainly with the alumina-containing supports.

The siliceous alumina bases preferred for the low temperature hydrocracking conversion process can be any synthetic or natural siliceous alumina composition of acid character which is effective for the cracking of hydrocarbons. The siliceous alumina base, before addition of the hydrogenation component thereon, should contain at least about 1%, and preferably at least 10% by wt. of alumina calculated as Al$_2$O$_3$. From the cracking activity standpoint, the siliceous alumina base of the catalyst in its preferred form should be one having a CAT A activity of at least 25 as measured by the method of J. Alexander and H. G. Shimp, National Petroleum News (1944) Vol. 36, p. R–357 and of J. Alexander, Proceedings Am. Pet. Institute (1947), Vol. 27, p. 51; alternatively the catalyst support should have a quinoline number of at least 20, according to the method of Mills, Boedeker and Oblad described in J. Am. Chem. Soc., 72, 1554 (1950). Illustrative of the preferred siliceous alumina cracking catalyst bases are synthetic silica-alumina, silica-zirconia and silica-alumina-magnesia catalysts. A preferred active siliceous alumina cracking base for use in the catalyst of this invention is comprised of a synthetically prepared composite of silica and alumina containing from about 10 to 40% by weight of the alumina component.

The preferred class of siliceous alumina cracking bases can be prepared by any one of several alternate methods. For example, an aqueous solution of an aluminum salt, suitably adjusted in acidity, may be combined with a solution of sodium silicate under such conditions that the corresponding gels are coprecipitated in intimate admixture. On the other hand, silica gel and alumina gel may be separately prepared and then mixed in the desired proportions. Alternately, a formed silica gel can be treated with an aqueous solution of an aluminum salt, and the alumina precipitated in the silica gel by the addition of a precipitant. In another method the silica-alumina may be prepared by first forming an acid-stabilized silica sol and then adding an absorptive alumina to raise the pH and cause the gelation of the mixture.

The alumina-containing support, however formed, must be "activated" before contact with the aqueous metal fluoride solution. Thus, rather than the so-called dried hydrogels which are not satisfactory for the purpose of the present invention, the alumina-containing support must be converted to the substantially dehydrated forms, such as are known as gamma, eta, theta and chi aluminas, by exposure to calcining temperatures, as described hereinabove. When such "activated" supports are treated by the present method, the resulting catalysts have good mechanical strength and the added metal, rather than having an appreciable amount lost into the substrata of the support, has a large surface exposed for promotion of hydrocarbon conversions.

Similarly, activated magnesia-containing supports can be prepared for use in this invention. Thus, a silica gel may be impregnated with a magnesium salt which is then precipitated in the gel by treatment of the gel with ammonia. Alternatively, a silica hydrogel can be thoroughly mulled with magnesia or magnesium hydroxide, or a slurry of magnesia can be added to a silica hydrosol which is allowed to gel. Such products are usually washed and dried, but for use in the present invention the further treatment of substantial dehydration as described above is essential. Similarly, silica-alumina-magnesia and other alumina and/or magnesia-containing supports can be prepared.

The improved method of preparing metal fluoride alumina base catalysts includes as an essential step the contacting of an "activated alumina" base for an appreciable time period with an aqueous solution of a fluoride of certain metals, especially the transition group metals, particularly at their lower valence. Usually it is preferred to employ much more metal fluoride than will be contained in one pore volume (calculated for the particular alumina base being used and the amount thereof) of a saturated solution of that metal fluoride. Such preferred operation involves either using increased volumes of the metal fluoride solutions, or having in contact with the aqueous solution a sufficient amount of solid metal fluoride to keep the solution saturated.

As indicated, the metal fluorides are preferably the fluorides of the metals having hydrogenation-dehydrogenation activity. Usually the iron transition group metals, and especially nickel, are most preferred since they tend to promote electron transfer reactions to a greater extent than other metals. Other desirable properties of this group of metals include their ready conversion to sulfides and like compounds which are not readily reduced in hydrogen atmospheres under normal operating conditions. More broadly desirable are the groups of metals having atomic numbers from 23 through 30. Particular fluorides are nickelous fluoride, cobaltous fluoride, vanadium fluoride, cupric fluoride, and their hydrates. Also useful are the fluorides of metals such as chromium, zirconium, palladium, aluminum and others so long as they are sufficiently stable in water solution. Normally, the fluorides of metals other than those of the oxides in the metal oxide support are preferred, particularly when dual function catalysts are desired. The aqueous solutions of the metal fluorides can be diluted or concentrated but are generally the latter for minimizing the volumes employed. Often, particularly with the metal fluorides of low solubility, it is preferable to employ an excess of solid metal fluoride over the amount which will saturate the water used. It is usually desirable to use enough water so as not only to cover the volume of alumina-containing catalyst support employed but also to provide for agitation to aid contacting and dissolution of the metal fluorides. If desired, the excess solid metal fluoride can be kept separated from the catalyst support by means of a porous plate or filter. Enough metal fluoride should be present to give a metal content in the alumina-containing support of at least 1% by weight, and preferably in the range of 3 to 40%, based upon the support employed. Ordinarily, the amount of metal fluoride will be the amount desired to be added to the alumina support to attain the activity desired for the selected catalytic conversion. Usually the amount of metal fluoride desired will be appreciably more than, e.g., at least twice, the amount of metal fluoride that will be contained in one pore volume of a saturated solution of that metal fluoride. The aqueous metal fluoride solution can contain a plurality of fluorides such as of metals which cooperate in certain catalytic reactions. Fluorides of the two or more metals will become associated with the alumina-containing support during the contacting step. For example, a combination desirable for hydrofining, e.g., sulfur removal, is that of nickel and cobalt, and these metals can be simultaneously incorporated into an alumina-containing support by one treatment with a solution of the two fluorides. The ability to add more metal in one contacting treatment is often an important advantage of the present method over prior methods where a plurality of metals are to be added in successive treatments with aqueous solutions and the first added metal dissolves readily in aqueous solutions.

The activated alumina catalyst support is kept in contact with the metal fluoride solution until the desired amount of metal fluoride becomes associated with or bound to the support. For example, sufficient time is allowed to add preferred amounts such as at least equivalent to 2 pore volumes of saturated metal fluoride solution. Normally this contacting step is conducted at room temperature, and where the alumina-containing support is finely divided such as in powdered form, or spray dried 100 mesh particles, contacting for at least 3–4 hours, preferably overnight (i.e., about 16 hours), at room temperature will be satisfactory. Longer times are allowed for obtaining the higher metal contents in the support; for example, with adequate agitation at room temperature about 3 days contact between a calcined silica-alumina in powdered or spray dried form and a $NiF_2$ solution maintained saturated, a catalyst containing about 40% Ni and about 23% F is obtained. When the activated alumina support has a larger particle size, longer contact times are also used. By raising the temperature such as to 150–200° F., the contact time may be lessened. Desirably, the temperature is adjusted so that the required amount of metal fluoride is added in about 1 to 2 hours contact time. However, since the chemisorption of the metal fluorides by the support is a relatively slow reaction, the contacting time is preferably at least three hours (temperature in the range from about room temperature to near the boiling point of water, i.e., about 200° F.) when the desired resulting metal content is about 3 wt. percent and more particularly when above 5 wt. percent. The alumina-containing support is preferably finely divided to a particle size below about 50 mesh, in order to obtain more nearly uniform dispersion of the metal throughout the support, particularly with added metal contents above 10% by wight.

The treating solution is essentially only metal fluoride, or a plurality of metal fluorides, and water; materials such as ammonia or amines or other basic materials or substances reactive with the support or metal fluorides are to be avoided.

After contacting the alumina-containing base with the metal fluoride solution for a sufficient time, the excess solution is decanted from the treated alumina base and the resultant metal fluoride alumina catalyst is then dried, preferably at relatively low temperatures (i.e., 250° to 500° F.) to avoid surface loss. Thereafter the metal fluoride alumina composition can be used as such but is normally subjected, as indicated hereinabove, to subsequent treatments prior to use. Thus the metal content may be converted, at least partially, to other catalytically active metal compounds such as to the sulfides or to other compounds, stable at the conditions of use, with members of Groups V and VI of the periodic table. When the catalyst is to be employed in at least partially sulfided form, as for low temperature hydrocracking, the dried catalyst is treated under sulfiding conditions preferably below 750° F., with a gaseous sulfiding agent, either directly or after intermediate treatments. Preferably, in order to keep the sulfiding temperature low and to obtain a more active sulfided metal fluoride catalyst, the dried catalyst such as the nickel fluoride silica-alumina catalyst, is first subjected to a reducing atmosphere at temperatures of the order of 800° to 1100° F., usually for three to ten hours, and preferably above about 850° F. for at least four hours. More specifically, the metal fluoride alumina-containing base resulting from the contacting of the alumina base with metal fluoride solution is dried, for example, for ten hours at temperatures of 250° F. Then the dried catalyst is heated for five to six hours at about 900° F. in a stream of hydrogen. Normally in such treatments the metal fluoride alumina-containing catalyst suffers no substantial loss of fluoride. Alternatively, the dried catalyst can be calcined in air and thereafter, if desired, the metal oxide (i.e., the oxide of the added metal) reduced to the metal state.

In a preferred embodiment, the catalyst before sulfiding is freed of any small amount of water-extractable fluoride. Such catalyst has a higher hydrocracking activity, thereby being capable of use at lower temperatures. Since nickel sulfide hydrocracking catalysts containing water-extractable fluoride, such as nickel catalysts treated with HF, $BF_3$ or the like, have high deactivation rates, probably due to the cracking activity of such fluoride, the present catalysts with substantially no water-extractable fluoride content will give low fouling rates and can be used in the hydrocracking process for long periods without deactivation. While catalyst prepared as set forth above has a low level of water-extractable fluoride relative to the total fluoride concentration, an even further improvement in the hydrocracking process is obtained by removing the trace of water-extractable fluoride due to metal fluoride not chemisorbed but remaining on the surface of the support. For this purpose the catalyst, after the contacting treatment, is washed with water. Preferably, the alumina or magnesia containing support with catalytic metal fluoride chemisorbed thereon is first dried and then either calcined in air or reduced to the metal before water washing, the latter being especially preferred. The water extraction can be carried out in any suitable manner, usually with hot water. In the laboratory, washing in a Soxhlet apparatus was found satisfactory. The washing is continued until the wash water shows by analysis substantial absence of fluoride. The resulting catalyst contains fluoride but not water-extractable fluoride such as results from prior impregnation techniques.

Thereafter, the catalyst is subsequently sulfided with a gaseous sulfiding agent under sulfiding conditions. It can be contacted with hydrogen sulfide or with hydrogen and organic sulfide at temperatures below about 750° F., and preferably below 700° F. For example, the sulfiding treatment can be effected at 1200 p.s.i.g. and 550–600° F., with hydrogen present in the amount of about 8000 s.c.f. per barrel of feed which can be made up of mixed hexanes containing, for example, 10% by volume of dimethyl disulfide. Alternatively, other sulfur compounds, such as hydrogen sulfide or carbon disulfide, mercaptans or other organic sulfides or disulfides can be used.

Optionally, after the metal fluoride treatment other metals can be added such as by the normal impregnation techniques. For example, after treatment with a mixture of nickel fluoride and cobalt fluoride, the catalyst can be dried and then impregnated with ammonium molybdate and calcined to yield a Ni-Co-Mo catalyst suitable for hydrofining.

In the preparation of the catalyst, preferably after the steps of metal fluoride contacting and subsequent drying but preferably before reduction and/or sulfiding, the catalyst is transformed to the desired shape. The catalyst can be used in the form of pellets, beads, extruded or other particle shapes. When the support has been treated in the preferred finely divided form, the resulting treated support is desirably converted into pellets or other larger-sized particles with the aid of a die lubricant, such as a hydrogenated vegetable oil, polyvinyl alcohols, or the like which is burned out usually before reducing treatment, if any, and sulfiding. Good results have been obtained with a catalyst mass made up of small beads having an average diameter of about ⅛ inch, as well as with a crushed aggregate prepared from said beads. Some of the catalysts in the powdered or spray dried forms are useful for so-called "fluidized" operation.

To illustrate the present invention, the following examples of preparations of catalysts are given, wherein surface areas of the alumina-containing supports are measured by nitrogen absorption according to the method of Brunauer, Emmett and Teller as described in J. Am. Chem. Soc., 60, 309 (1938). In the CO chemisorption method of determining the surface area of the added metal, a known mixture of carbon monoxide, carbon-14 monoxide, and helium or other inert gas is pumped at a constant rate over the calcined and reduced metal-containing catalyst and the concentration of the CO in the effluent gas is calculated from the declining count of radioactive disintegrations of carbon-14 monoxide. A detailed description of the CO chemisorption method is given by T. R. Hughes, R. P. Sieg and R. J. Houston in A.C.S. Petroleum Division Preprints, vol. 4, No. 2, page C-33 (1959).

*Example 1*

A calcined silica-alumina catalyst containing 25% alumina (Aerocat Triple A) in spray-dried powder form, and having a pore volume of 0.89 cc./gm. and a surface area of 500 meters$^2$/gram as measured by nitrogen isotherm was employed. About 10–15 cc. of such silica-alumina at a temperature of about 250° F. was introduced into about 200 cc. of a filtered, saturated solution of nickelous fluoride (2.6 gms./100 ml.) and allowed to stand overnight. The excess solution was separated from the catalyst by filtering. The solution had partially decolorized and the treated catalyst had a green color. The solid catalyst was dried at 300° F. for 3 hours. An analysis showed 6.05 wt. percent Ni and 2.3% F.

*Example 2*

One volume of another sample (15 cc., 7.2 gms.) of the same calcined catalyst used in Example 1, at about 250° F., was introduced into 30 volumes (450 cc.) of the saturated $NiF_2$ at room temperature and allowed to stand overnight with occasional agitation. The solution decolorized from a dark blue green to a pale yellow green. Then analysis of the solution showed .45 wt. percent Ni and .33 wt. percent F., from which it was calculated that the catalyst contained 21 wt. percent Ni and 12% F. on a dry basis. The treated catalyst after drying for 3 hours at 300° F. analyzed as containing 23% Ni and 8.9% F.

*Example 3*

Into a vessel containing a saturated solution of $NiF_2$ was introduced a calcined silica-alumina catalyst containing 25% alumina (Aerocat Triple A having a surface area of 500 m.$^2$/gm. and a pore volume of 0.89 cc./gm.). A porous container of nickelous fluoride tetra-hydrate crystals was immersed in the $NiF_2$ solution. The supernatant solution over the catalyst was stirred for 83 hours at room temperature and then the treated catalyst was separated from the solution. After drying at 600° F. for 4 hours, the catalyst contained 12.2 wt. percent Ni and 6.4% F.

*Example 4*

Two preparations were made up at the same time to compare the effect of temperature on the time for chemisorbing the metal fluoride in the larger amounts normally desired. Each of these preparations used 100 gms. of an activated alumina in spray-dried form and 67.89 gms. of cobaltous fluoride dehydrate together with enough water to make 1 liter. Preparation A was kept at a temperature in the range of about 175–200° F. and preparation B was kept at room temperature. Both preparations were continuously stirred and water was added from time to time to maintain the volume at 1 liter. As determined by following the optical density of the solutions, the cobalt fluoride was chemisorbed on the alumina support in both preparations at about the same rate for the first two to three hours. Thereafter the chemisorption of the cobalt fluoride by the support continued at about the same rate in the heated preparation but at an appreciably slower rate in preparation B at room temperature. This indicates that for the higher desired amounts of metal fluoride increased temperatures are helpful in minimizing the additional time required to chemisorb substantially all the metal fluoride in the contacting solution.

Example 5

About three volumes of 20–26 mesh alumina (Filtrol 90) which had been calcined at 600° F. for 4 hours and had a surface area of 240 m.$^2$/gm. and a pore volume of 0.40 cc./gm. was placed in a vessel along with 10 volumes of 1.4% aqueous nickel fluoride solution. The mixture was stirred overnight at room temperature, then filtered, dried at 400° F. for 9 hours and calcined at 900° F. for 4 hours. The product contained 5.73% Ni and 2.04% F. Such catalyst can be used for isomerization.

Example 6

The product of Example 5 was further treated as follows: About one volume of an aqueous solution containing equal parts ammonium molybdate, concentrated ammonium hydroxide and water, was poured over about 2 volumes of the above product. After standing 10 minutes, the mixture was filtered, dried at 400° F. for 9 hours and calcined at 900° F. for 4 hours, whereby the molybdate was converted to the oxide. The final product contained 10.6% Mo, 4.8% Ni and 1.7% F.

Example 7

About 6 volumes of activated, 200 mesh silica-alumina (Aerocat Triple A) containing 25% alumina and having a surface area of 500 m.$^2$/gm. and a pore volume of 0.89 cc./gm., was placed into 100 volumes of 0.2 wt. percent aqueous solution of cobaltous fluoride. After standing 24 hours the supernatant solution was colorless, indicating substantially all the cobaltous fluoride had reacted with the calcined silica-alumina. After standing several days, the catalyst was filtered and dried for 3 hours at 300° C. The catalyst then contained 3.74% Co and 3.05% F.

Example 8

About 6 volumes of activated, 200 mesh silica-alumina (Aerocat Triple A) containing 25% alumina, and having a surface area of 500 m.$^2$/gm. and a pore volume of 0.89 cc./gm. was placed into 100 volumes of 0.2 wt. percent aqueous solution of cobaltic fluoride. After standing 24 hours the supernatant solution was colorless, indicating substantially all the cobaltic fluoride had reacted with the calcined silica-alumina. After standing several days, the catalyst was filtered and dried for 3 hours at 300° C. The catalyst then contained 2.02% Co and 2.34% F.

Example 9

About 6 volumes of activated, 200 mesh silica-alumina (Aerocat Triple A) containing 25% alumina and having a surface area of 500 m.$^2$/gm. and a pore volume of 0.89 cc./gm. was placed into 100 volumes of 0.2 wt. percent aqueous solution of chromium fluoride $$(CrF_3.2\tfrac{1}{2}H_2O)$$
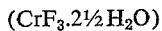

After standing 24 hours the supernatant solution was colorless, indicating substantially all the chromium fluoride had reacted with the calcined silica-alumina. After standing several days, the catalyst was filtered and dried for 3 hours at 300° C. The catalyst then contained 1.26% Cr and 1.12% F.

Example 10

A calcined silica-alumina catalyst in spray-dried powdered form (60 micron average particle size, containing 25% alumina and having a pore volume of 0.8 cc./gm.) was contacted with stirring for 78 hours with a saturated aqueous solution of nickelous fluoride at a ratio of 2 volumes of catalyst to 15 volumes of the solution. The treated catalyst was filtered and then washed three times with distilled water. After drying for 16 hours at 300° F., the catalyst analyzed as containing 23.9 wt. percent Ni and 13.7% F.

Example 11

About 1 volume of alumina-silica in spray-dried powdered form (200 mesh) (and containing about 13% alumina and having a surface area of 500 m.$^2$/gm. and a pore volume of .74 cc./gm.) was placed in a vessel with 30 volumes of water containing a porous thimble filled with $NiF_2.H_2O$ and allowed to stand at room temperature for 11 days with some stirring of the slurry of the alumina-silica and nickel fluoride solution. After drying in a kiln for 3 hours at 300° F., the catalyst analyzed as containing 41% Ni and 18% F.

Example 12

"Activated" alumina powder with a surface area of about 300 m.$^2$/gm. as measured by nitrogen isotherms, has a CO chemisorption value of about 4 micromoles/gm. After contacting such beads with an aluminum fluoride solution for 24 hours at 75° F., the catalyst had, after drying and calcining, an increased aluminum content of 3 wt. percent Al (calculated as metal from the amount removed from the solution in the contacting period), a substantially increased CO chemisorption value of the order of 12 micromoles/gm., and a fluoride content of about .4%. The resulting catalyst had a surface with an excess of aluminum atoms and is superior to a catalyst prepared by mixing aluminum salts including fluoride with alumina hydrogel, in that the former has substantially increased activity for isomerization.

Example 13

Activated magnesia with a surface area of 300 m.$^2$/gm., in 200 mesh powdered form, was contacted in a 1:15 volume ratio with a saturated aqueous nickel fluoride solution with stirring for 24 hours at room temperature. The catalyst, after drying at 300° F. for 3 hours, contained 6.8 wt. percent Ni and 3.3% F.

Example 14

A calcined silica-alumina containing 25% alumina in spray-dried powdered form and having a pore volume of 0.89 cc./gm. and a surface area of about 500 square meters per gram as measured by nitrogen isotherm was employed. 123 gms. of such silica-alumina, together with 4 liters of distilled water and 99.92 gms. of cobaltous fluoride was stirred for 11 hours at room temperature. The solid material was collected by filtering through a Buechner funnel and then dried for 3 hours at about 150° C. The dried product contained 25.4% Co and 9.8% F.

Example 15

A calcined alumina in spray-dried powdered form and having a pore volume of 0.5 cc./gm. and a surface area of 200 m.$^2$/gm. was used in an amount of 100 gms. and along with 152 gms. of $CoF_2.2H_2O$ and 2.48 gms. of 3.36 gms. of $CuF_2.2H_2O$ and $NiF_2.4H_2O$, respectively, were added to one liter of distilled water and stirred continuously for 24 hours, allowed to stand without stirring for 18 hours and then stired continuously for 42 hours at room temperature. The treated aluminas were vacuum filtered and then dried for 5 hours at about 200° C.

The above preparations had the following analyses:
(1) 34.9% cobalt and 0.1% copper (calculated as metal)
(2) 23.5% cobalt and 0.25% nickel (calculated as metal).

Example 16

To 400 gms. of Example 15 alumina which had been heated for 10 hours at 700° F. was added in 2 liters of water while stirring, 81 gms. of cobaltous fluoride dihydrate and 303 gms. of nickelous fluoride tetrahydrate. The product (Sample 16–1) contained 6.5% cobalt and 14.6% nickel. Similarly, to 400 gms. of the same calcined alumina and 2 liters of water was added 84 gms. of ferrous fluoride and 303 gms. of nickelous fluoride at a pH of 3, giving a product (Sample 16–2) with 3.1% iron and 11.3% nickel. Also, starting with 400 grams of the above alumina and 2 liters of water and adding while stirring 167 gms. of ferrous fluoride dihydrate at a pH of 3 and 162 gms. of cobaltous fluoride dihydrate gave a product (Sample 16–3) with 9.5% iron and 11.1% cobalt.

*Example 17*

A series of catalysts were formed using the calcined alumina of Example 15 by the following procedure: for each sample, 200 cc. of the alumina and 1 liter of water were used as the starting materials. With the exception noted below, each sample was prepared by adjusting with HF the pH of the water to 3, adding the specified amount of metal fluorides, stirring for 48 hours at room temperature, vacuum filtering, drying at 300° F. for about 6 hours, and then measuring the metal contents. For Sample 17–1, 96 gms. of ferrous fluoride dihydrate and 48 gms. of cobaltous fluoride dihydrate were added, the product analyzing as 17.5% iron and 9.1% cobalt. For Sample 17–2, 167 gms. of ferrous fluoride dihydrate were added, the resulting product containing 19.3% Fe. For Sample 17–3, 84 gms. of ferrous fluoride dihydrate and 104 gms. of nickelous fluoride tetrahydrate were added, the product containing 11.1% Ni and 8.06% Fe. For Sample 17–4, 30 gms. of ferrous fluoride dihydrate, 163 gms. of nickelous fluoride tetrahydrate, 7.1 gms. of cupric fluoride dihydrate, 4.8 gms. of chromic fluoride tetrahydrate were added, the product showing 3.6% Fe, 16.3% Ni, 4.9% Co and 0.4% Cr. For Sample 17–5, 137 gms. of ferrous fluoride dihydrate and 43 gms. of nickelous fluoride tetrahydrate were added, the product showing 4.6% Ni and 14.8% Fe.

*Example 18*

A solution was made up with 10.58 gms. of antimony trifluoride and 10 gms. of nickelous fluoride tetrahydrate by dissolving first the nickelous fluoride and then the antimony trifluoride and the solution made up to 1 liter. Then 450 cc. of the above solution was used to contact 15 cc. of the same silica-alumina as used in Example 1. After being mixed at regular intervals for 24 hours, the mixture was filtered and the catalyst dried for 3 hours at 300° F. The resulting catalyst (18–1) contained 25.4 wt. percent antimony, 5.66 wt. percent nickel and 8.66 wt. percent fluorine. Also, 450 cc. of the antimony trifluoride-nickelous fluoride solution was contacted in the same manner as above with 15 cc. of the alumina used in Example 5. After mixing at regular intervals for 24 hours and filtering the catalyst was dried for 3 hours at 300° F. The resulting catalyst product (18–2) contained 13.3 wt. percent antimony, 3.56 wt. percent nickel and 7.72 wt. percent fluorine In both the catalyst products the nickel and antimony were highly dispersed on the supports. Nickel antimonide formed in such catalyst preparation gives a catalyst particularly on the acidic silica-alumina cracking support which can be used without sulfiding for hydrocracking and light hydrocarbon conversions, the catalyst having the hydrogenating component with a high melting point (1153° C. for nickel antimonide in the bulk). Other mixtures such as fluorides of nickel and arsenic can also be used to prepare catalysts containing, for example, nickel arsenide and similar components can be formed with other metals such as cobalt.

Numerous other examples of catalysts preparation in accordance with this invention can be given by way of illustration. The aqueous metal fluorides mentioned hereinabove can be used in treating alumina and/or magnesia-containing supports as described. There follows directions for making some of such catalysts.

*Example 19*

A calcined alumina in powdered form is contacted with a saturated solution of cupric fluoride until 20% Cu (calculated as metal) becomes absorbed. After drying the treated catalyst the copper is converted substantially to the oxide, whereupon the catalyst is suitable for use in oxidation-reduction reactions, such as for conversion of NO to $NO_2$.

To illustrate that large amounts of metal are added in the metal fluoride treatment of the present invention, the amount of metal added by one metal fluoride treatment in accordance with the present invention was determined and compared with the amount of metal that would be deposited by evaporation of the water from a saturated metal fluoride solution just sufficient in volume to fill the pores of the alumina support treated. The ratio of the actual metal added to the catalyst support to the amount of metal calculated from a pore volume of saturated solution of the metal salt can be designated as the "adsorption factor." With metal salt solutions of low concentration and large surface area alumina-containing catalyst supports there appears to be some selectively small increase in added metal even with metal salts other than metal fluorides, possibly due to some localized super saturation and other side effects. However, the data given in the following table shows that the "adsorption factors" for the metal fluorides are far greater than for other metal salts. For each test, one volume of a calcined activated alumina-silica containing 25% alumina and having a pore volume of 0.89 cc./gm. was immersed in 15 volumes of the metal salt solutions of the indicated salt contents and allowed to remain for 24 hours at room temperature. After drying at 300° F. for 5 hours the treated alumina catalyst was analyzed for metal content and in the cases of the fluoride treated samples, also for fluorine content. The results are given in the following table:

TABLE I

| Metal Salt | Metal Salt Concentration In Treating Solution (Moles/Liter) | Wt. Percent On Treated Catalyst | | Adsorption Factor |
|---|---|---|---|---|
| | | Metal | Fluoride | |
| $NiF_2$ | 0.060 | 11.85 | 5.34 | 34 |
| $NiCl_2$ | 0.053 | 1.45 | | 5 |
| $NiBr_2$ | 0.051 | 1.65 | | 6 |
| $CoF_2$ | 0.020 | 3.7 | 3.1 | 34 |
| $CrF_3$ | 0.012 | 1.26 | 1.12 | 24 |
| $Ni(NO_2)$ | 0.036 | 1.30 | | 7 |

It will be noted that in all instances in Table I the metal fluorides have adsorption factors many times larger than the highest of the other salts. Hence, the metal salts generally employed in present method have adsorption factors in the range of at least 15 and preferably above 20.

The high surface area for added metal in the metal fluoride-treated alumina-containing catalysts of the invention can be illustrated by comparing CO chemisorption values for added metal on an equal weight basis when obtained on the catalyst support in the present metal fluoride treatment and other treatments such as by impregnation with other salts such as the nitrates. The following Table II gives the CO chemisorption values for a series of catalysts of various metal contents obtained by treating samples of silica alumina catalyst (containing 25% alumina and having a surface area of 500 and a pour volume of 0.8 cc./gm.) with $NiF_2$ solutions and in another series impregnating one or more times with nickel nitrate solutions.

TABLE II

| Ni Content (Wt. Percent) | CO Chemisorption (μmoles/gm. Ni) | |
|---|---|---|
| | NiF$_2$ | Ni(NO$_3$)$_2$ Impregnated Catalyst |
| 2.5 | 550 | |
| 7.5 | | 200 |
| 10 | 500 | |
| 11 | | 220 |
| 16 | | 130 |
| 20 | 270 | 130 |
| 40 | 215 | |

It will be noted that the NiF$_2$ treated catalysts have more than twice the surface area per gram of nickel than the catalysts prepared by impregnation with nickel nitrate. Further, the difference in surface areas are more pronounced at metal contents of about 3 to 10% by weight of nickel.

The catalyst of this invention is useful in a number of hydrocarbon conversion processes, but finds particular utility in operations involving the conversion of hydrocarbon fractions to low boiling products at relatively low temperatures of about 400° to 700° F. In such process the pressure ranges from 400 to 3000 p.s.i.g., and at least 150 s.c.f. of hydrogen is introduced into the reactor for each barrel of feed. At preferred feed rates of 0.2 to 5 liquid hourly space velocity (LHSV), at least 20%, and generally 40–70%, of the feed is converted to lower boiling materials. In general, the feed material to be contacted with a sulfided nickel fluoride on silica-alumina catalyst prepared by the method of this invention can be any one of the conventional hydrocarbon distillate fractions boiling in the range of about 100° F. to 950° F., and having at total nitrogen content below about 100 p.p.m., usually below 50 p.p.m., and preferably below 10 p.p.m., which nitrogen content can be obtained by hydrofining or otherwise. Suitable feeds which can be employed to provide such selected stock for treatment with the catalyst of the present invention are those generally defined as fractions containing $C_6$, $C_7$ and/or $C_8$ hydrocarbons, light or heavy gasoline, naphthas, kerosene distillates, light or heavy gas oils, catalytic cycle oils, coker distillates and the like. These can be of straight-run origin as obtained from petroleum, or they can be derived from various processing operations, and in particular, from thermal or catalytic cracking stocks obtained from petroleum, gilsonite, shale, coal tar or other sources. The products of the hydrocarbon processes utilizing the catalyst of the present invention will depend upon the aromatically or paraffinicity of the feed material and may comprise light branched hydrocarbons such as isobutane and isopentane, high octane motor gasoline, a catalytic high octane reformer feed of high naphthene content, petrochemical intermediates such as xylenes, durene, etc., high quality diesel and jet fuels, low pour point fuels from high pour point fuels and the like.

The above process of hydrocracking hydrocarbon distillates and the improvements obtained therein with the use of a catalyst prepared in accordance with the present invention are described further and claimed in the application, Serial No. 220,086, filed August 28, 1962, under the title "Hydrocarbon Conversion Process." Therein is disclosed that sulfided nickel fluoride silica-alumina hydrocracking catalysts prepared by treating active silica-alumina cracking catalysts with aqueous nickel fluoride and subsequently sulfiding, are especially effective in converting petroleum distillates and other hydrocarbon fractions to lower boiling products in a selective manner with a minimum loss to side reactions. Moreover, these results are obtained with high per pass conversions at relatively low temperatures. Furthermore, in spite of their high activity, these catalysts operate for long periods of time without fouling. Further, these catalysts, when properly prepared and used, retain their activity for a long time. The low fouling resulting from the use of the present fluoride-containing catalyst is surprising since fluoride-containing catalysts heretofore proposed foul rapidly in low temperature hydrocracking. Apparently, this unobvious effect results from introducing the fluoride with the metal ion through chemisorption of the metal fluoride on the activated silica-alumina support. In previous methods, the fluoride is introduced after the metal component is deposited on the support, the fluoride usually being added by treatment with aqueous hydrofluoric acid or anhydrous hydrogen fluoride or with decomposable fluoride compounds, the fluoride in the final catalyst composition being water soluble. By introducing the fluoride with the metal ion in the present method, the support is not attacked, and the surface area is even increased above that of the support.

The following examples illustrate further preparations in accordance with the present invention, transformation of the added metal to sulfide form and use of the catalyst so prepared in hydrocarbon conversions.

Example 20

A sulfided nickel fluoride catalyst was prepared by contacting 1 volume of powdered calcined (at 800° F.) silica-alumina catalyst with 30 volumes of an aqueous saturated solution of nickel fluoride. After standing overnight the solution was decanted from the solid catalyst and the solid filtered from the remaining solution. The solid was then dried at about 300° F. for 3 hours. Analysis of the catalyst showed 23% Ni and 9% F. Thereafter the catalyst was prereduced with hydrogen at 900° F. for 3 hours.

Then the catalyst was placed in a reactor and hydrogen at ambient temperature and pressure was passed through the reactor with the temperature gradually being raised to 550° F. At this point the pressure was raised to 1200 p.s.i.g. and the hydrogen stream admixed with normal decane containing 2 vol. percent of dimethyl disulfide at 550° F. initially, with the proportion of hydrogen and dimethyl disulfide being adjusted to give the equivalent of 0.6% of $H_2S$ in the gas. With the start of the sulfiding of the nickel the temperature quickly rose to 560° F. and remained there for the remainder of the period of 4½ hours during which the n-decane contained dimethyl disulfide. The conditions during this period were as follows:

Average catalyst temperature _____° F__ 560
Pressure _____p.s.i.g__ 1185
$H_2$/feed (mole ratio) _____ 9.6
$H_2$ rate (s.c.f./b.) _____ 6,500
Space rate (LHSV) _____ 8.0
Residence time (sec.) _____ 14.7

Then, after passing hydrogen over the catalyst to sweep out excess dimethyl disulfide, pure normal decane was passed over the sulfided nicked fluoride silica alumina catalyst. Within the first half hour the temperature increased from 551° to 569° F., the other conditions for the reaction being as follows:

Pressure _____p.s.i.g__ 1185
$H_2$/feed (mole ratio) _____ 9.2
$H_2$ rate (s.c.f./b.) _____ 6,300
Space rate (LHSV) _____ 8.0
Residence time (sec.) _____ 15.3

During this perod the conversion was 91.3 wt. percent to material boiling below n-decane, of which material 93.6% boiled above propane and 75.5% consisted of $C_4$ to $C_7$ isoparaffins.

The following examples illustrate that the metal fluoride treated alumina-containing catalyst of the present invention have very low fouling rates.

Example 21

A catalyst prepared in accordance with Example 10 above was placed in a glass reactor and prereduced 3 hours at 900° F. by passing a stream of hydrogen over the catalyst at the rate of 4 cu. ft./hr. and atmospheric pressure. Then the catalyst was treated for 1 hour at 570° F. and 1200 p.s.i.g. and exposed to dimethyl sulfide added to the hydrogen stream to give the equivalent of 2% of $H_2S$ in the gas. This sulfiding treatment was continued until there was an amount of sulfide equivalent to 2.1 theories of $H_2S$ based on $Ni_3S_2$. The catalyst was then employed in low temperature hydrocracking of a hydrofined light cycle oil having the following inspections:

| | |
|---|---|
| Gravity, ° API | 30 |
| Aniline point, ° F. | 93 |
| Nitrogen (basic), p.p.m. | 0.2 |
| Aromatics, vol. percent | 48 |
| Olefins, vol. percent | 1 |
| Paraffins, vol. percent | 51 |
| ASTM distillation (D-158): | |
| End point | 570 |
| 5% | 420 |
| 10 | 434 |
| 30 | 460 |
| 50 | 476 |
| 70 | 493 |
| 90 | 519 |
| 95 | 532 |
| End point | 570 |

The reaction conditions were 6500 s.c.f. hydrogen per barrel of feed, 1200 p.s.i.g. total pressure, and a space velocity of 1.0 LHSV, with the temperature being varied between 560° F. and 600° F. to give approximately 60% conversion of feed to product boiling below 400° F.

After 140 hours the temperature had been raised to about 590° F. Thereafter the run was continued an additional period (to a total of 322 hours) within which the temperature for 60% conversion per pass varied between 590° and 600° F., indicating very good resistance to fouling. The product during the latter period had a gravity of about 46° API and an aniline point ranging from 108–114°, which shows that very little aromatic ring saturation occurred.

In a similar test with the same catalyst as above except that it was prereduced at 900° F., the run leveled out after 30 hours on stream at about 550° F. and remained at such temperature until the run was terminated at 70 hours. No fouling of the catalyst was observed in this run. The product had an aniline point of 117° F. and a gravity of about 46° API.

These runs illustrate that excellent conversions of hydrocarbon feed to highly desirable products can be obtained with the present catalysts for very long periods of time, from hundreds to thousands of hours. In contrast, fluoride introduced into the catalyst separately from the metal, as in prior methods, causes fouling of the nickel sulfide silica-alumina catalyst when used in a hydrocracking process. Thus, fluorided and sulfided nickel on silica-alumina catalysts prepared by impregnating with nickel nitrate and treating with hydrogen fluoride gave much higher fouling rates. For example, such a catalyst prepared by nickel nitrate impregnation of silica-alumina beads to a 10.8% nickel content, treated with aqueous HF and then calcined at 800° F. before sulfiding, gave a fouling rate of about 0.40° F./hr. (i.e., required such temperature increase to maintain conversions) when used with the feed and under the conditions set forth in Example 16 above. With a catalyst prepared by impregnation of silica-alumina beads with nickel nitrate to a nickel content of about 25%, and then fluorided before sulfiding, the fouling rate was even higher.

The following example illustrates the improvement of the special embodiment of removing the water-extractable fluoride from the catalyst.

Example 22

A calcined silica-alumina catalyst in spray-dried, powdered form (containing 25% alumina and having a pore volume of 0.8 cc./gm.) in an amount of 800 cc. was contacted with stirring for 78 hours with 6 liters of water containing 623 gm. of nickelous fluoride. The treated catalyst was filtered and then dried for 16 hours at 300° F. The dried material was then pelleted into 8–14 mesh particles and heated in air for 4 hours at 950° F. Then the particles were divided into three parts and identified as catalysts A, B and C.

Catalyst A was extracted with hot water in Soxhlet extractor for thirty dumps. The extracted catalyst pellets were dried and reduced in a flowing stream of hydrogen at 900° F. for 6 hours. The reduced catalyst contained 33.6% Ni and 5.7% F.

Catalyst B was reduced in a flowing stream of hydrogen at 900° F. for 6 hours and then Soxhlet extracted for 30 dumps of hot water. The catalysts then contained 30% Ni and 4.4% F.

Catalyst C was reduced in a flowing stream of hydrogen at 900° F. for 6 hours but was not extracted with water. This sample contained 32.7% Ni and 5.7% F.

All three catalysts were sulfided and subjected to the activity test as described hereinabove, except that the temperature of the test was 570° F. Also, the aniline points of the products were measured.

The results of the above tests on the several catalysts were as follows:

| Catalyst | Activity Index | Aniline Pt. of Product, °F. |
|---|---|---|
| A (Water extracted after calcination) | 32.6 | 110 |
| B (Water extracted after reduction) | 37.7 | 126 |
| C (No water extraction) | 23.7 | 113 |

It will be noted that the highest activity is obtained when the catalyst prepared by nickel fluoride chemisorption is both calcined and reduced before water washing, and hence, this method is preferred.

Also, catalysts can be prepared by the present method for use in other reactions as mentioned above and illustrated in the following example:

Example 23

The catalyst prepared in Example 6 hereinabove was placed in a reactor, which was pressured with 75 p.s.i.g. hydrogen sulfide and then up to 1000 p.s.i.g with hydrogen. The gases were recycled over the catalyst for 4 hours at a rate of about 3 liters per hour, during which time the temperature was about 575° F. After this sulfiding step, the excess hydrogen sulfide was removed from the reactor. Then, hydrofining including nitrogen removal was carried out with this catalyst by passing through the reactor, as a feed, a middle cut of a California crude heavy gas oil having the following composition:

| | |
|---|---|
| Boiling range ° F. | 728–812 |
| Total nitrogen percent | 0.31 |
| Basic nitrogen do | 0.12 |
| Sulfur do | 0.81 |
| API gravity at 60° | 19.5 |
| Av. mol. wt. | 350 |
| Paraffins and napthenes percent | 46.5 |
| Aromatics do | 52.4 |
| Olefins do | 1.1 |
| Aniline pt. | 147.4 |

After bringing the temperature up gradually to 800° F., the pressure was held at 1000 p.s.i.g. with a feed space rate of 1.0 LHSV and a hydrogen flow rate of 4000 s.c.f./barrel of feed. The product obtained had the following composition:

| | |
|---|---|
| Average ° API gravity | 27.2 |
| Average mol. wt. | 238 |
| Aniline pt. | 136 |
| Basic nitrogen, p.p.m. | 5–6 |

As indicated above, the catalysts of the present invention have improved activity as compared to similar catalysts prepared by other procedures. The activities of catalysts for low temperature hydrocracking can be tested by determining in the presence of the catalyst the conversion of a selected standard and readily obtainable hydrocarbon feed stock of defined physical and chemical characteristics, to products falling below the boiling point of said stock under defined operating conditions.

The feed stock employed is a catalytic cycle oil recovered as a distillate fraction from the effluent of a fluid type of catalytic cracking unit, the recovered fraction being one containing essentially equal proportions of aromatics and of paraffins plus naphthenes, and boiling over a range of from approximately 400 to 575° F., as determined by ASTM D–158, prior to any hydrofining treatment given the feed to reduce its basic nitrogen content to a level below 5 p.p.m., this being the maximum amount permitted in the test feed. The specific test feed employed in obtaining the activity index values given herein was obtained from a fluid catalytic cracking unit being charged with a mixture of light and heavy gas oils cut from a Los Angeles Basin crude. This test stock was hydrofined by passing the same along with 3500 s.c.f. hydrogen per barrel of feed through a hydrofining catalyst containing cobalt oxide (2% cobalt) on a coprecipitated molybdena-alumina (9% molybdenum) support at a pressure of 800 p.s.i.g., an LHSV of 1, and at a temperature between 700° F. and 750° F. This hydrofining operation was accompanied by a hydrogen consumption of 300 to 400 s.c.f. hydrogen per barrel of feed and resulted in a reduction of the basic nitrogen content in the liquid effluent to less than 5 p.p.m. The hydrofined test stock had the following inspections:

TABLE III
INSPECTIONS OF TYPICAL HYDROFINED CYCLE OIL TEST SAMPLE

| | |
|---|---|
| Gravity, °API | 30 |
| Aniline point, °F. | 93 |
| Nitrogen (basic), p.p.m. below | 5 |
| Aromatics, vol. percent | 48 |
| Olefins, vol. percent | 1 |
| Paraffins plus naphthenes vol. percent | 51 |
| ASTM distillation (D–158): | |
| Start | 357 |
| 5% | 420 |
| 10 | 434 |
| 30 | 460 |
| 50 | 476 |
| 70 | 493 |
| 90 | 519 |
| 95 | 532 |
| End point | 570 |

Prior to hydrofining, the cycle oil had a gravity of 28° API, and ASTM D–158 start of about 400° F., and a basic nitrogen content of about 175 p.p.m. The reduction in ASTM start in hydrofining was due to a small amount of cracking.

The equipment employed in determining the activity index of the catalyst is a conventional continuous feed pilot unit, operated once-through with hydrocarbon feed and hydrogen gas. It consists of a cylindrical reaction chamber operated down flow with a preheating section, followed by a section containing the catalyst under test, and enclosed in a temperature controlled metal block to permit controlled temperature operation, together with the necessary appurtenances, such as feed burettes, feed pump, hydrogen supply, condenser, high pressure separator provided with means for sampling the gas and liquid phases, back pressure regulators, and thermocouples. For accuracy in hydrogen feed, hydrogen is compressed into a hydrogen accumulator or burette whence it is fed to the reactor by displacement with oil fed at constant rate from a reservoir by means of a pump.

In testing a catalyst to determine its activity index, the foregoing hydrofined cycle oil test stock, along with 8000 s.c.f. $H_2$ per barrel of feed, is passed through a mass of catalyst (65 ml. were actually employed) at a liquid hourly space velocity of 2 and at a furnace temperature of 550° F., the actual feed rate employed being 130 ml. per hour. The run is continued for 14 hours under these conditions, with samples being collected at about two-hour intervals. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation are usually regarded as representative of steady-state operating conditions and may be distilled to determine conversion to product boiling below the initial boiling point of the feed. This conversion under steady test conditions is a true measure of the activity of the catalyst. However, the API gravity rise, that is, the API gravity of the product sample or samples minus the API gravity of the feed, is a rapid and convenient method of characterizing the catalyst which correlates smoothly with conversion. For convenience the foregoing API gravity rise is referred to as the activity index of the catalyst.

While reference has been made above to the use of a particular catalytic cycle stock in connection with determining the activity index of the catalyst, similar activity index values can be obtained with catalytic cycle stocks obtained from other than California crudes provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

The product aniline points determined by the method of the preceding paragraph, when compared with the aniline point of the feed, offer an index to the capacity of the catalyst to produce a satisfactory balance between the simultaneous conversion reactions involving disproportionation-cracking, isomerization-cracking, and hydrogenation.

The low temperature hydrocracking catalyst prepared in accordance with Example 10 was pelleted with the aid of a small amount of hydrogenated vegetable oil, oxidized with air at 950° F. for 4 hours to drive off the vegetable oil, then reduced for 6 hours at 900° F., and thereafter placed in the reactor where it was sulfided in the manner described in Example 15 above. The resulting catalyst was subjected to the above-described activity test and showed an activity index of 41.6. This illustrates that the hydrocracking catalysts prepared by the present method give high conversions at relatively low temperatures. With such high activities, the iso to normal ratio of the $C_4$ to $C_6$ paraffin fraction of the product is higher for a given conversion than lower activity catalysts prepared by other methods, since lower temperatures which favor such ratios can be used here.

The above examples are illustrative of the improved method of obtaining metals, and compounds thereof, in a state of high surface area on supports containing activated alumina or magnesia. The examples also indicate that the catalysts produced by this invention are used advantageously on reactions which are accelerated by the surface of a metal or metal compound on a support. In addition to the particular utility of sulfided nickel fluoride on alumina-silica supports for low temperature hydrocracking, the catalysts prepared in accordance with the method of the present invention are variously useful in other hydrocarbon conversions such as cracking, hydrofining, dehydrogenation, oxidation, isomerization, reforming and the like. For instance, a dehydrocyclization catalyst may be prepared by first soaking powdered calcined alumina in a chromous fluoride solution until the catalyst contains about 10% Cr. The treated alumina powdered can then be slurried, mixed with a binder and extruded into pellets. After drying, the chromium can be converted substantially to $Cr_2O_3$ on an empirical basis, by exposure to an oxidizing atmosphere at about 1200° F.

As will be evident to those skilled in the art, various modifications of this invention can be made or followed in the light of the foregoing disclosure and discussion without departing from the spirit or scope of the disclosure or scope of the appended claims.

We claim:

1. The method of preparing improved catalysts having catalytically active metals in a highly dispersed state on a support containing at least one metal oxide selected from the class consisting of alumina and magnesia, said catalytically active metals having hydrogenation-dehydrogenation activity, which method comprises contacting said metal oxide support in a substantially dehydrated state and having a relatively high surface area for at least three hours with an aqueous solution of a fluoride of at least one of said metals for a sufficient time and with sufficient metal fluoride present to chemisorb at least one weight percent of metal fluoride, calculated as metal, on said support and washing the catalyst with water to remove substantially all the water-soluble fluorides remaining on the support and leaving the chemisorbed metal fluorides on the support.

2. The method of claim 1 wherein the catalyst is subjected to a reducing atmosphere before the washing step and the washed catalyst is dried and then sulfided with a gaseous sulfiding agent.

3. The method of claim 1 wherein said aqueous solution contains a plurality of metal fluorides.

4. A catalytic process for selectively converting during a single contact with catalyst, at least 20% of hydrocarbon feed of low nitrogen content to products boiling below the initial boiling point of said feed with a minimum loss of feed to undesirable side reactions, which comprises passing said feed, along with at least 1500 s.c.f. of hydrogen per barrel of said feed and with the consumption of at least 500 s.c.f. of hydrogen per barrel of said feed converted to lower boiling products, at more than 350 p.s.i.g. hydrogen partial pressure and below 750° F. at more than 0.2 v./v./hour liquid hourly space velocity, over a sulfided nickel fluoride silica-alumina catalyst prepared by chemisorbing 5 to 40%, on a dry weight basis, of nickel fluoride on an active alumina-containing cracking support, removing residual water-extractable fluoride, and leaving chemisorbed metal fluoride on said support and sulfiding the resulting dried fluoride-containing catalyst.

References Cited by the Examiner

UNITED STATES PATENTS

| | | | |
|---|---|---|---|
| 2,914,461 | 11/1959 | Ciapetta | 208—111 |
| 2,944,005 | 7/1960 | Scott | 205—109 |
| 3,117,076 | 1/1964 | Brenner et al. | 208—139 |

PAUL M. COUGHLAN, *Primary Examiner.*

ALPHONSO D. SULLIVAN, *Examiner.*